US006766066B2

(12) United States Patent
Kitazawa (10) Patent No.: US 6,766,066 B2
(45) Date of Patent: Jul. 20, 2004

(54) DETECTION OF POINTED POSITION USING IMAGE PROCESSING

(75) Inventor: Takayuki Kitazawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 610 days.

(21) Appl. No.: 09/808,154

(22) Filed: Mar. 15, 2001

(65) Prior Publication Data

US 2002/0011987 A1 Jan. 31, 2002

(30) Foreign Application Priority Data

Mar. 31, 2000 (JP) .......................................... 2000-098157
Feb. 23, 2001 (JP) .......................................... 2001-048556

(51) Int. Cl.$^7$ ................................................. G06K 9/36
(52) U.S. Cl. ....................... 382/291; 382/295; 382/314; 345/179; 345/180; 345/183
(58) Field of Search ................................ 382/103, 151, 382/190, 206, 274, 282, 291, 295, 313; 348/333.02, 333.09, 333.1, 341; 345/179, 180, 183; 11/314

(56) References Cited

U.S. PATENT DOCUMENTS

| | | | | |
|---|---|---|---|---|
| 4,995,071 A | * | 2/1991 | Weber et al. ............. | 348/14.08 |
| 5,170,220 A | * | 12/1992 | Matsumoto et al. ........ | 356/121 |
| 5,572,251 A | * | 11/1996 | Ogawa ................... | 348/207.99 |
| 5,617,135 A | * | 4/1997 | Noda et al. .............. | 348/14.12 |
| 5,642,156 A | * | 6/1997 | Saiki ........................ | 348/14.09 |
| 5,917,543 A | * | 6/1999 | Uehara ...................... | 348/211.9 |
| 5,963,246 A | * | 10/1999 | Kato ......................... | 348/14.09 |

FOREIGN PATENT DOCUMENTS

JP      A 2000-81950       3/2000

* cited by examiner

Primary Examiner—Bhavesh M. Mehta
Assistant Examiner—Yosef Kassa
(74) Attorney, Agent, or Firm—Oliff & Berridge PLC (57) ABSTRACT

The present invention provides a technique that detects a pointing position, which is pointed with a pointing device having a light emitter, in a display image with a higher accuracy. A pointing position detection apparatus includes: a photographic image capture section that captures a photographic image by shooting the display image including a pointing image generated by light emitted from the light emitter of the pointing device; and a detection processing section that detects the pointing position in the display image according to a luminance property of the captured photographic image. The detection processing section first determines a threshold value, which is used to binarize the photographic image, according to the luminance property of the photographic image. The detection processing section then binarizes the photographic image using the determined threshold value, so as to generate a binary image. The detection processing section subsequently computes a position of a center of gravity in one pixel area having relatively high luminance values, out of two types of pixel areas constituting the binary image, so as to detect the pointing position.

23 Claims, 11 Drawing Sheets

DETECTION OF POINTED POSITION USING IMAGE PROCESSING

BACKGROUND OF THE INVENTION

1. Field of the Invention

The present invention relates to a technique of detecting a pointing position, which is pointed with a pointing device having a light emitter, in a display image.

2. Description of the Related Art

A projector that causes images output from a computer to be projected and displayed on a screen is generally used for presentation. A presenter gives explanations while pointing at an arbitrary position in a computer image displayed on the screen with a pointing device.

It is very convenient and desirable that the presentation system detects the pointing position, which is pointed with the pointing device, for a diversity of processing. In the recent trend, the presenter has accordingly used a pointing device having a light emitter, such as a laser pointer. The system has a shooting device that takes photographic images of the presentation aspect. The system causes the photographic image to undergo a predetermined series of processing, so as to detect the pointing position. A concrete procedure of the system binarizes the photographic image with a fixed threshold value and computes a position of a center of gravity in one pixel area having relatively high luminance values (effective pixel area), out of two types of pixel areas in the binarized photographic image (binary image), so as to detect the pointing position.

In some cases, however, the prior art technique has difficulties in accurately detecting the pointing position.

For example, an increase in angle between the normal direction of the screen and the pointing device having the light emitter expands the area irradiated with the light emitter, for example, to a quasi-elliptical shape. In the prior art system, the threshold value is fixed, so that not only the vicinity of the pointing position but its peripheral region are extracted into the binary image as an effective pixel area. This causes the position of the center of gravity in the effective pixel area to be deviated from the pointing position. It is accordingly difficult to accurately detect the pointing position.

SUMMARY OF THE INVENTION

The object of the present invention is to solve the problems of the prior art technique and thus to provide a technique that detects a pointing position, which is pointed with a pointing device having a light emitter, in a display image, with a higher accuracy.

At least part of the above and the other related objects is attained by a first apparatus of the present invention, which is a pointing position detection apparatus that detects a pointing position, which is pointed with a pointing device having a light emitter, in a display image. The pointing position detection apparatus includes: a photographic image capture section that captures a photographic image by shooting the display image including a pointing image generated by light emitted from the light emitter of the pointing device; and a detection processing section that detects the pointing position in the display image according to a luminance property of the captured photographic image. The detection processing section has: a threshold value determination section that determines a threshold value, which is used to binarize the photographic image, according to the luminance property of the photographic image; a binarization processing section that binarizes the photographic image using the determined threshold value, so as to generate a binary image; and a gravity center position computation section that computes a position of a center of gravity in one pixel area having relatively high luminance values, out of two types of pixel areas constituting the binary image, so as to detect the pointing position.

In the pointing position detection apparatus, the detection processing section detects the pointing position using the threshold value, which is determined according to the luminance property of the photographic image. This arrangement allows the pointing position, which is pointed with the pointing device having the light emitter, in the display image to be detected with a higher accuracy.

In the specification hereof, the pixel value is referred to as the 'luminance value'. The pixel value may also be referred to as the 'density value'.

In accordance with one preferable embodiment of the pointing position detection apparatus, the threshold value determination section creates a luminance value distribution, which represents a count of pixels at each luminance value, based on the photographic image, and sets the threshold value equal to a luminance value determined by taking into account the luminance value distribution and a preset threshold value determination condition.

The threshold value can readily be determined by using the luminance value distribution created from the photographic image.

In the above pointing position detection apparatus, it is preferable that the threshold value allows extraction of a pixel area in the binary image which is smaller than an area of the pointing image in the photographic image.

The arrangement of determining the threshold value in the above manner allows extraction of only a neighborhood area surrounding the pointing position, which is pointed by the light emitter of the pointing device, into the binary image, thus ensuring accurate detection of the pointing position.

In accordance with another preferable embodiment of the pointing position detection apparatus, the detection processing section further includes a table that stores a plurality of threshold value determination conditions, which are provided respectively for a plurality of available pointing devices. In this embodiment, the threshold value determination section determines the threshold value using a threshold value determination condition selected among the plurality of threshold value determination conditions.

Selection of a desired pointing device results in determining the threshold value suitable for the selected pointing device. This ensures the detection process of the pointing position adequate for the pointing device.

In the above pointing position detection apparatus, it is preferable that the detection processing section repeatedly carries out detection of the pointing position.

This allows the pointing position to be detected continually.

In accordance with another embodiment of the pointing position detection apparatus, the photographic image capture section has a shooting device that takes the photographic image.

In the above embodiment, the pointing device may have the light emitter that emits either a visible light or an invisible light, and the shooting device may sense a light component emitted from the light emitter.

In the pointing position detection apparatus of the above embodiment, it is preferable that the shooting device has a filter that allows transmission of the light component emitted from the light emitter of the pointing device, while cutting off other light components.

This arrangement gives the photographic image including the pointing image generated by the light emitted from the light emitter of the pointing device, thus facilitating the subsequent steps of the detection process.

In the pointing position detection apparatus of the above embodiment, it is preferable that the shooting device has an aperture to adjust brightness of the photographic image.

This arrangement gives the photographic image suitable for the luminance of the light emitted from the light emitter of the pointing device.

In accordance with one preferable application of the above pointing position detection apparatus, the detection processing section further includes a table that stores a plurality of shooting conditions, which are respectively provided for a plurality of available pointing devices. In this application, the position detection section controls the shooting device to adjust the aperture, based on a shooting condition selected among the plurality of shooting conditions.

Selection of the desired pointing device automatically gives the photographic image suitable for the luminance of the light emitted from the light emitter of the pointing device.

A second apparatus of the present invention is a presentation system that includes: a pointing position detection apparatus having any of the above arrangements; and an image display apparatus that causes the display image to be displayed in a display area.

This presentation system includes the pointing position detection apparatus discussed above and accordingly exerts the similar functions and advantages to those of the pointing position detection apparatus discussed above. Namely the pointing position, which is pointed with the pointing device having the light emitter, in the display image can be detected with a higher accuracy.

In accordance with one preferable embodiment of the present invention, the pointing position detection apparatus causes the detected pointing position to be reflected on predetermined data processing.

This arrangement allows execution of a diversity of processing according to the detected pointing position. One exemplified procedure makes the detected pointing position reflected on the image display apparatus and enables a pointer or a cursor to be shown at the pointing position in the display image.

In the above presentation system, the image display apparatus may be a projector that projects the display image from either one of a front side and a rear side of a screen including the display area.

The present invention is also directed to a method of detecting a pointing position, which is pointed with a pointing device having a light emitter, in a display image. The method includes the steps of: (a) capturing a photographic image by shooting the display image including a pointing image generated by light emitted from the light emitter of the pointing device; and (b) detecting the pointing position in the display image according to a luminance property of the captured photographic image. The step (b) has the steps of: (b1) determining a threshold value, which is used to binarize the photographic image, according to the luminance property of the photographic image; (b2) binarizing the photographic image using the determined threshold value, so as to generate a binary image; and (b3) computing a position of a center of gravity in one pixel area having relatively high luminance values, out of two types of pixel areas constituting the binary image, so as to detect the pointing position.

This method exerts the similar functions and advantages to those of the first apparatus of the present invention discussed above. Namely the pointing position, which is pointed with the pointing device having the light emitter, in the display image can be detected with a higher accuracy.

The present invention is further directed to a computer program product that causes a computer to detect a pointing position, which is pointed with a pointing device having a light emitter, in a display image. The computer program product has: a computer readable recording medium; and a computer program recorded in the recording medium. The computer program causes the computer to attain the functions of: capturing a photographic image by shooting the display image including a pointing image generated by light emitted from the light emitter of the pointing device; and detecting the pointing position in the display image according to a luminance property of the captured photographic image. The detection function includes the functions of: determining a threshold value, which is used to binarize the photographic image, according to the luminance property of the photographic image; binarizing the photographic image using the determined threshold value, so as to generate a binary image; and computing a position of a center of gravity in one pixel area having relatively high luminance values, out of two types of pixel areas constituting the binary image, so as to detect the pointing position.

The computer executes the computer program included in this computer program product to exert the similar functions and advantages to those of the first apparatus of the present invention discussed above. Namely the pointing position, which is pointed with the pointing device having the light emitter, in the display image can be detected with a higher accuracy.

The principle of the present invention is actualized by a variety of applications, for example, a method of detecting a pointing position, a pointing position detection apparatus, a presentation system, a computer program that attains the method or the functions of the apparatus, a recording medium in which the computer program is recorded, and a data signal that includes the computer program and is embodied in a carrier wave.

DESCRIPTION OF THE PREFERRED EMBODIMENT

A. Structure of Apparatus

Figure 1:
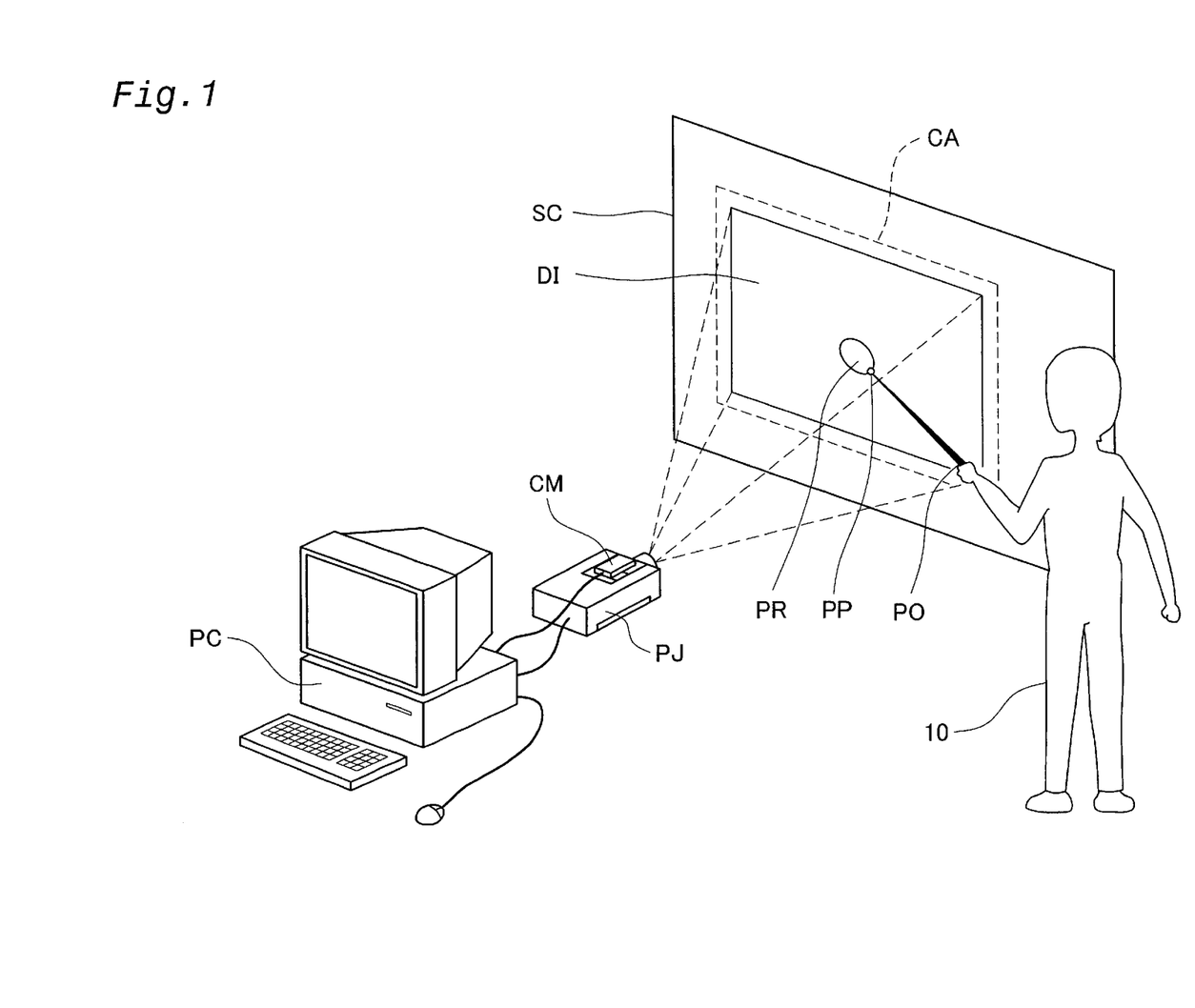
FIG. 1 illustrates a presentation system in one embodiment of the present invention.

One mode of carrying out the present invention is discussed below according to an embodiment. FIG. 1 illustrates a presentation system in one embodiment of the present invention. The presentation system includes a projector PJ, a computer PC, and a camera CM. The computer PC is connected to both the projector PJ and the camera CM. The projector PJ is a front-type liquid crystal projector that projects images from the front side or the observation face side of the screen SC to a display area on the screen SC.

The computer PC functions as an image signal supply apparatus and transmits image signals, which represent an image same with a computer image displayed on its display section, to the projector PJ. The projector PJ projects and displays the computer image (display image) DI on the screen SC according to the given image signals.

A presenter 10 gives explanations while pointing at an arbitrary position in the display image DI on the screen SC with a pointing device PO. The pointing device PO used in this embodiment has a light emitter on one end thereof. Typical examples of the pointing device include a pointing stick with a lamp attached to one end thereof and a laser pointer. The light emitter of the pointing device may emit a visible light like red light or an invisible light like infrared light.

The camera CM is a CCD camera that senses a light component like a visible light and infrared light, emitted from the light emitter of the pointing device PO. The camera CM shoots an area CA that includes at least the whole display image DI. When the arbitrary position in the display image DI is pointed with the pointing device PO, the photographic image has a pointing image (light emission image) generated by the light emitted from the light emitter of the pointing device. The photographic image is sent from the camera CM to the computer PC.

In the case where the pointer has the lamp attached to one end thereof, the camera CM directly shoots the light emitted from the lamp and also shoots the reflected light produced by irradiation of the screen with the light emitted from the lamp. When the laser pointer is used for the pointing device, on the other hand, the camera CM shoots only the light reflected from the screen. In the specification hereof, the term 'reflection' includes diffused reflection (scattered reflection).

The computer PC causes the photographic image to undergo a predetermined series of processing, so as to detect an end position PP of the pointing device PO, that is, a pointing position PP pointed by the light emitter of the pointing device PO. In this embodiment, the detected pointing position PP is expressed by the position (coordinates) in the display image DI. The coordinates of the pointing position PP are used for various processes carried out in the computer PC. The computer PC generates a computer image in which a pointer or a cursor is superimposed at the pointing position PP and displays the generated computer image on its display section, while displaying the same computer image on the screen SC via the projector PJ.

As discussed previously, an increased angle between the normal direction of the screen SC and the pointing device causes not only the pointing position PP but its peripheral region PR on the screen SC to be irradiated with the light emitted from the light emitter of the pointing device PO. The prior art technique can not accurately detect the pointing position PP in the photographic image including a relatively large pointing image (the pointing position PP and the peripheral region PR). The technique of this embodiment negates part of the peripheral region PR in the pointing image, thus enabling the pointing position PP to be detected with a higher accuracy.

Figure 2:
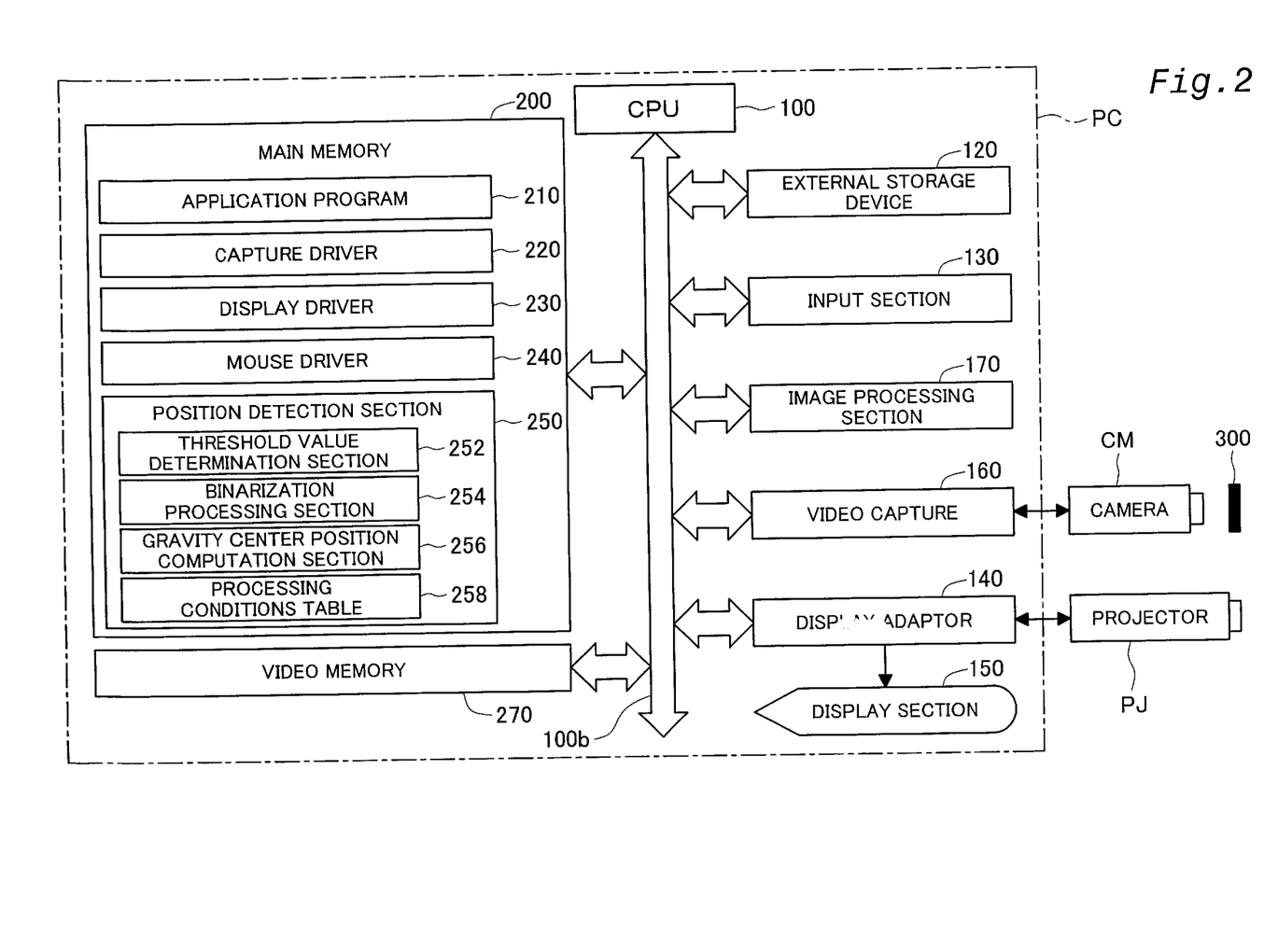
FIG. 2 is a block diagram illustrating the internal structure of the computer PC of FIG. 1.

FIG. 2 is a block diagram illustrating the internal structure of the computer PC of FIG. 1. The computer PC includes a CPU 100, an external storage device 120 such as a hard disk device and a floppy disk device, an input section 130 such as a keyboard and a mouse, a display adaptor 140, a display section 150, a video capture 160, an image processing section 170, a main memory 200 including a ROM and a RAM, and a video memory 270. The CPU 100, the external storage device 120, the input section 130, the display adaptor 140, the video capture 160, the image processing section 170, the main memory 200, and the video memory 270 are connected with one another via a bus 100b. A variety of interface circuits that are actually included are omitted from the illustration of FIG. 1.

The main memory 200 stores computer programs therein, which actualize the functions of an application program 210, a capture driver 220, a display driver 230, a mouse driver 240, and a position detection section 250.

The display driver 230 supplies image signals, which represent a computer image generated by the application program 210, to both the display section 150 of the computer PC and the projector PJ via the display adaptor 140.

The capture driver 220 captures an image shot by the camera CM via the video capture 160 and stores the captured photographic image data into the video memory 270. A specific optical filter 300, which allows transmission of the light component emitted from the light emission part of the pointing device PO while cutting off other light components, is attached to the lens of the camera CM.

The position detection section 250 controls the capture driver 220, so as to control the camera CM via the video capture 160. The position detection section 250 also controls the image processing section 170 and carries out the processing, in cooperation with the image processing section 170, to detect the pointing position PP.

The position detection section 250 includes a threshold value determination section 252, a binarization processing section 254, a gravity center position computation section 256, and a processing conditions table 258 including threshold value determination conditions and shooting conditions. The threshold value determination section 252 determines the threshold value for binarizing a photographic image according to the luminance properties of the photographic image stored in the video memory 270. In this embodiment, the threshold value determination section 252 creates a histogram and a cumulative area rate graph according to the photographic image and determines the threshold value by taking into account the cumulative area rate graph and a preset threshold value determination condition. The binarization processing section 254 binarizes the photographic image using the determined threshold value, so as to generate a binary image. The gravity center position computation section 256 computes a position of a center of gravity in one pixel area of relatively high luminance values, out of two types of pixel areas constituting the binary image, so as to detect the pointing position PP. A diversity of data including the histogram, the cumulative area rate graph, and the threshold value may be stored in either of the image processing section 170 and the main memory 200. The video memory 270 may be constructed as part of the main memory 200. The details of the processing carried out by the position detection section 250 will be discussed later.

The image processing section 170 constructed as part of the hardware in this embodiment may be actualized by software on the main memory 200. The hardware construction as in the case of this embodiment is, however, desirable for the high-speed image processing.

The mouse driver 240 causes a mouse pointer to be displayed at a position, which is specified by the detection data of the pointing position PP to correspond to the pointing position PP in the display image DI, via the display driver 230 and the display adaptor 140. The image including the mouse pointer is displayed on both the display section 150 of the computer PC and the screen SC.

The computer programs actualizing the functions of the respective parts 210, 220, 230, 240, and 250 are provided in a specific form recorded in computer readable recording media such as flexible disks or CD-ROMs. The computer reads the computer programs from the recording media and transfers the computer programs to either an internal storage device or an external storage device. The computer programs may alternatively be supplied to the computer via a communication path. A microprocessor in the computer executes the computer programs stored in the internal storage device to implement the functions of the computer programs. The computer may directly read and execute the computer programs recorded in the recording media.

In the specification hereof, the computer is a concept including the hardware and an operating system and represents the hardware working under the control of the operating system. In the case where the operating system is not required and the application program alone activates the hardware, the hardware itself corresponds to the computer. The hardware includes at least the microprocessor, such as a CPU, and means for reading the computer programs recorded in the recording media. The computer program includes program codes to cause the computer to attain the functions of the respective parts enumerated above. Part of such functions may be actualized by the operating system, instead of the application program.

The 'recording media' in the present invention include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

As clearly understood from the above discussion, the computer PC and the camera CM of this embodiment correspond to the pointing position detection apparatus of the present invention. The capture driver 220, the video capture 160, and the camera CM correspond to the photographic image capture section, while the camera CM corresponds to the shooting device. The position detection section 250 and the image processing section 170 correspond to the detection processing section of the present invention.

B. Processing to Detect Pointing Position

Figure 3:
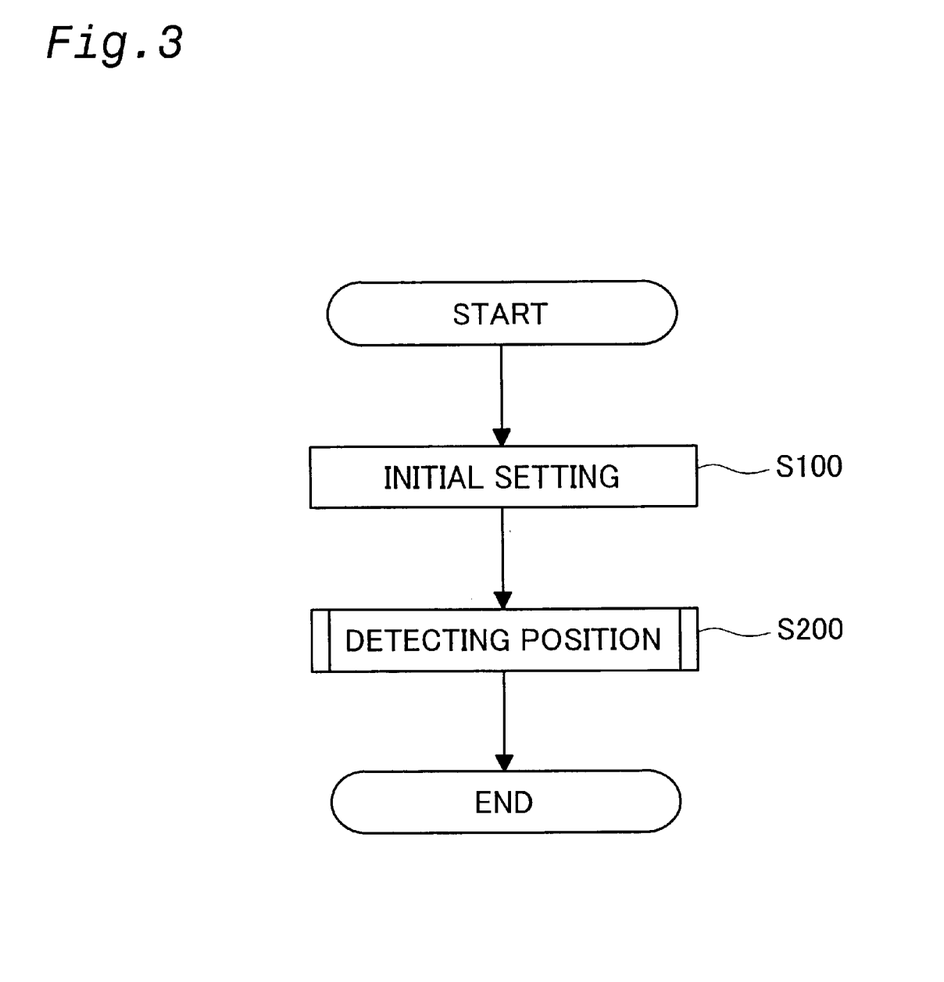
FIG. 3 is a flowchart showing a series of processing to detect the pointing position.

FIG. 3 is a flowchart showing a series of processing to detect the pointing position. In the computer PC, execution of a computer program attaining the function of the position detection section 250 starts the processing to detect the pointing position.

At step S100, the position detection section 250 executes a series of processing for initial settings. The initial settings include setting a diversity of conditional values (or calibrations) to detect the pointing position pointed with the pointing device PO.

For example, the initial settings sets (calibrates) the positional relationship between the photographic image and the display image DI. The coordinates in the photographic image are thus mapped to the coordinates in the display image DI. It should be noted that the shooting area of the camera CM is set in advance.

In the procedures of this embodiment, according to a presenter's selection of the type of the pointing device, the initial settings sets shooting conditions of the camera CM and a threshold value determination condition used at step S200. In concrete procedures, the position detection section 250 causes a selection window (not shown) for selecting the type of the pointing device to be displayed on the display section 150 of the computer PC. The selection window is generated, based on the processing conditions table 258 included in the position detection section 250. The selection window includes display of plural pointing devices, which allows the presenter to select a desired pointing device. The shooting conditions and the threshold value determination condition are then set according to the selected pointing device. In this embodiment, the shooting conditions include a condition for adjusting the aperture of the camera CM to regulate the brightness of the photographic image.

In the following discussion, it is assumed that the pointing device selected at step S100 has a light emitter to emit infrared light.

At subsequent step S200, the position detection section 250 detects the pointing position in the photographic image. In the procedures of this embodiment, the processing of step S200 is carried out repeatedly until an instruction is given to terminate the processing to detect the pointing position.

Figure 4:
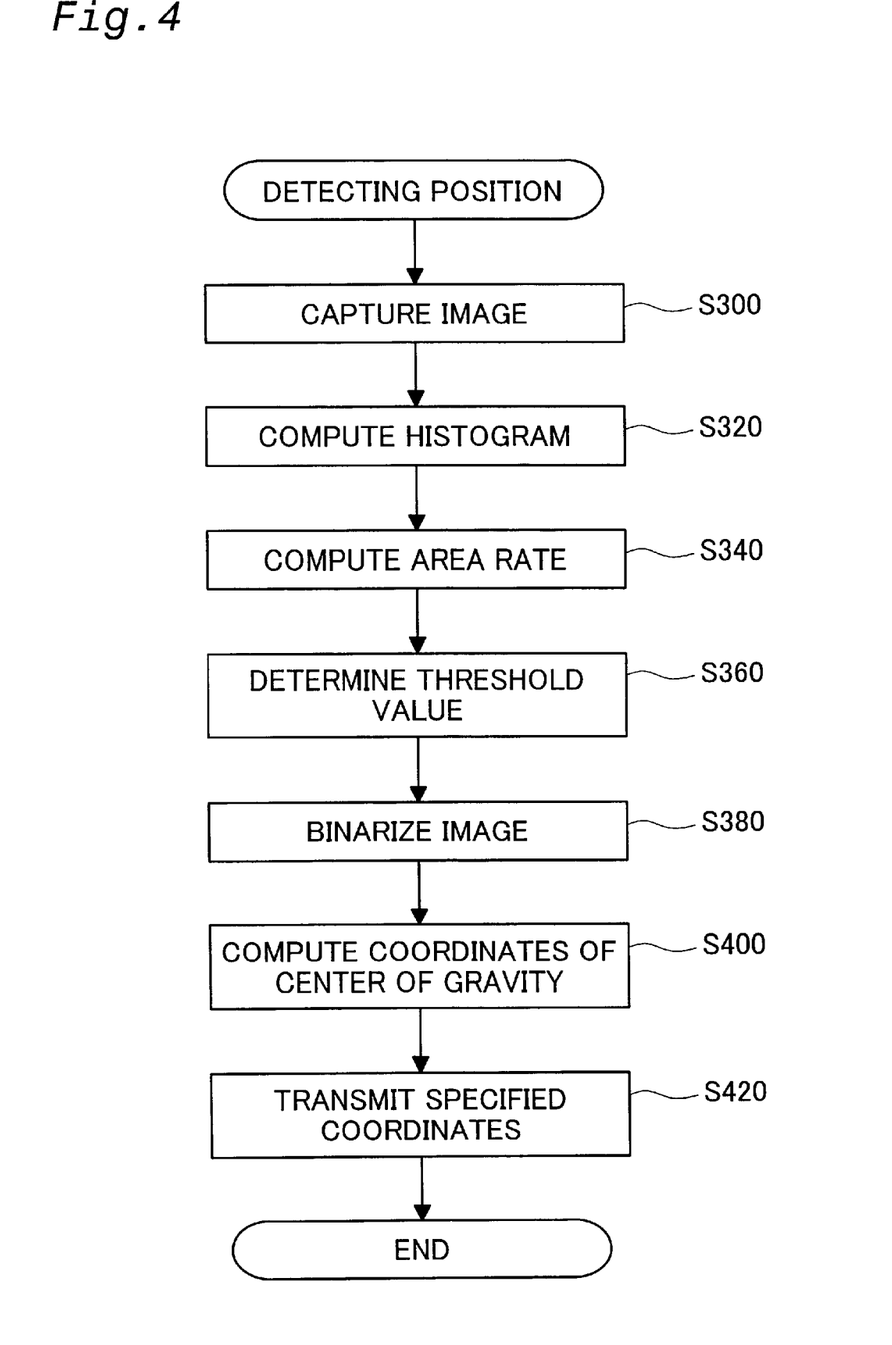
FIG. 4 is a flowchart showing details of the processing at step S200 of FIG. 3.

FIG. 4 is a flowchart showing details of the processing at step S200 of FIG. 3. At step S300, the position detection section 250 causes the capture driver 220 to capture the image shot with the camera CM. The captured photographic image is stored in the video memory 270.

As in the procedures of this embodiment, when the pointing device PO emits infrared light, an infrared light transmission filter (hereinafter referred to as the 'infrared filter') is applied for the optical filter 300 (FIG. 2). After the adjustment of the aperture of the camera CM according to the selected pointing device PO at step S100, the procedure of step S300 obtains an image shot, where only the infrared light directly emitted from the pointing device PO and the infrared light reflected from the screen are extracted and included in the photographic image. Namely application of the infrared filter in the condition of the adjusted aperture gives the photographic image, in which only a specific area emitting the infrared component on the display image DI is valid and the residual area on the display image DI is invalid.

When the pointing device PO is a laser pointer that emits red light, a red light transmission filter (hereinafter referred to as the 'red filter') is applied for the optical filter 300 (FIG. 2). After the adjustment of the aperture of the camera CM according to the selected pointing device PO at step S100, the procedure of step S300 obtains an image shot, where only the red light reflected from the screen is extracted and included in the photographic image. Namely application of the red filter in the condition of the adjusted aperture gives the photographic image, in which only a specific area emitting the red light component of relatively high luminances on the display image DI is valid and the residual area on the display image DI is invalid.

In the latter case that uses the laser pointer, a relatively small value is set to the aperture. Such setting gives the photographic image, in which the red light component of relatively high luminances emitted from the light emitter of the pointing device is extracted.

Figure 5:
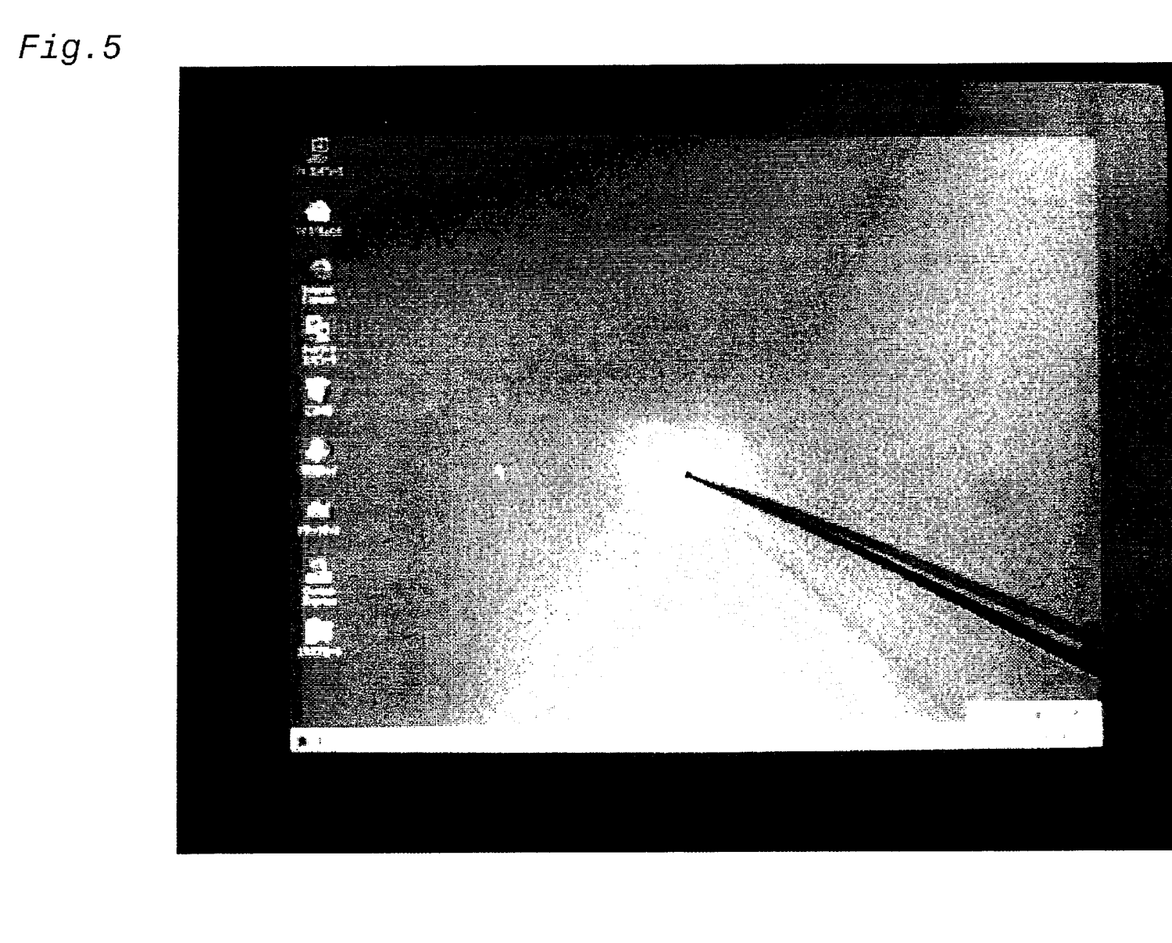
FIG. 5 shows an example of photographic image taken without an infrared filter attached to the camera CM.

FIG. 5 shows an example of photographic image taken without an infrared filter attached to the camera CM. The example of FIG. 5 is a photographic image showing the aspect in which the presenter points at a specific position with the pointing device PO on a display image (computer image) projected on the screen SC by the projector PJ. This allows observation of a pointing image, that is generated by the infrared light emitted from the light emitter, at the end of pointing device PO. A relatively high luminance area appearing below the pointing image is ascribed to the projector PJ and is not generated by the infrared light emitted from the light emitter of the pointing device PO.

Figure 6:
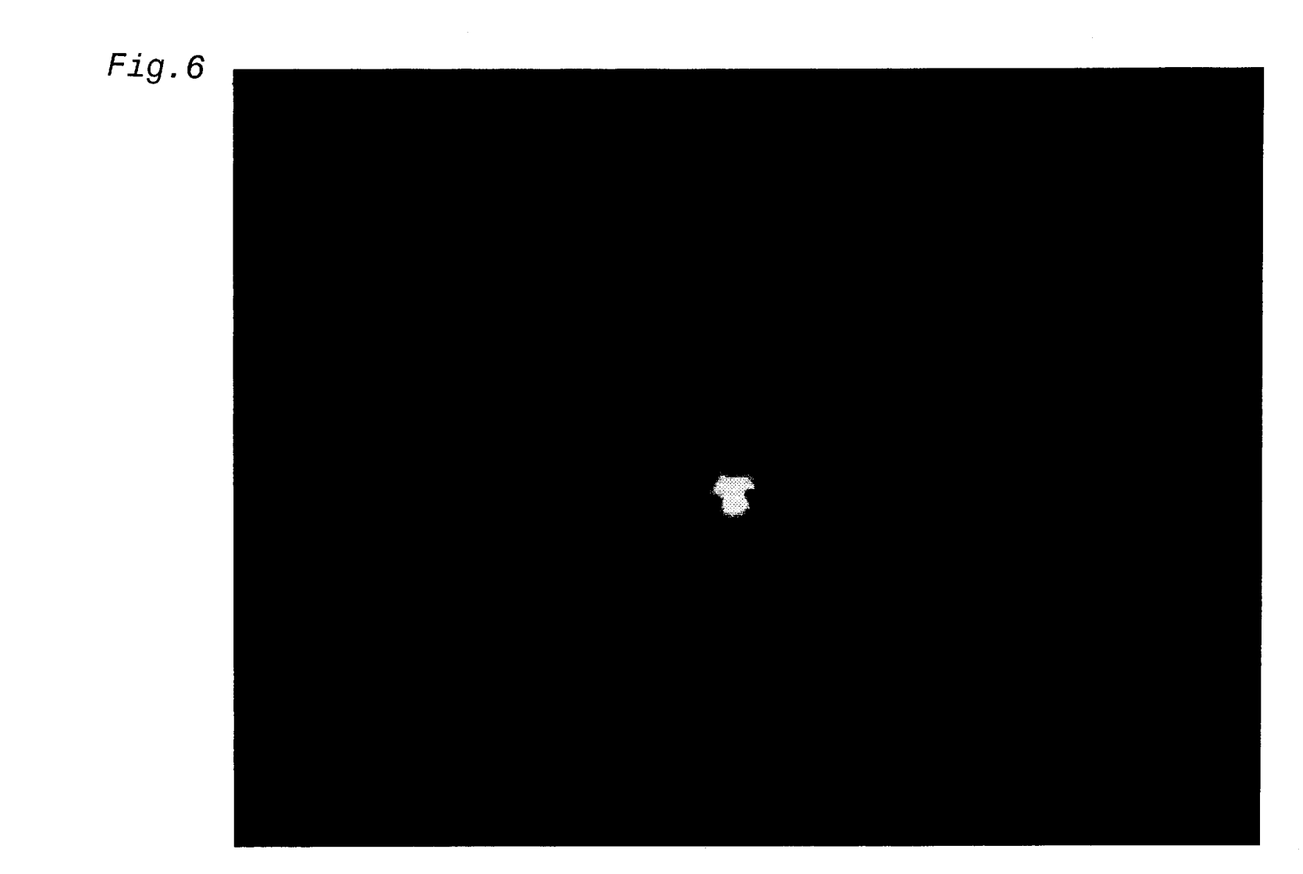
FIG. 6 shows an example of photographic image taken with an infrared filter attached to the camera CM.

FIG. 6 shows an example of photographic image taken with an infrared filter attached to the camera CM. The photographic image of FIG. 6 shows a similar state as that of FIG. 5. Comparison between FIGS. 5 and 6 proves that attachment of the infrared filter to the camera CM allows the area of the pointing image generated by the infrared light emitted from the light emitter of the pointing device PO to be readily discriminated from the residual area including the display image DI. Application of the infrared filter thus facilitates extraction of only the pointing image into the photographic image.

At step S320 (FIG. 4), the threshold value determination section 252 in the position detection section 250 (FIG. 2) controls the image processing section 170 to create a histogram based on the photographic image (FIG. 6) obtained at step S300. In this embodiment, the data of the histogram are stored in the image processing section 170. The data of the histogram may alternatively be stored in the main memory 200.

Figure 7:
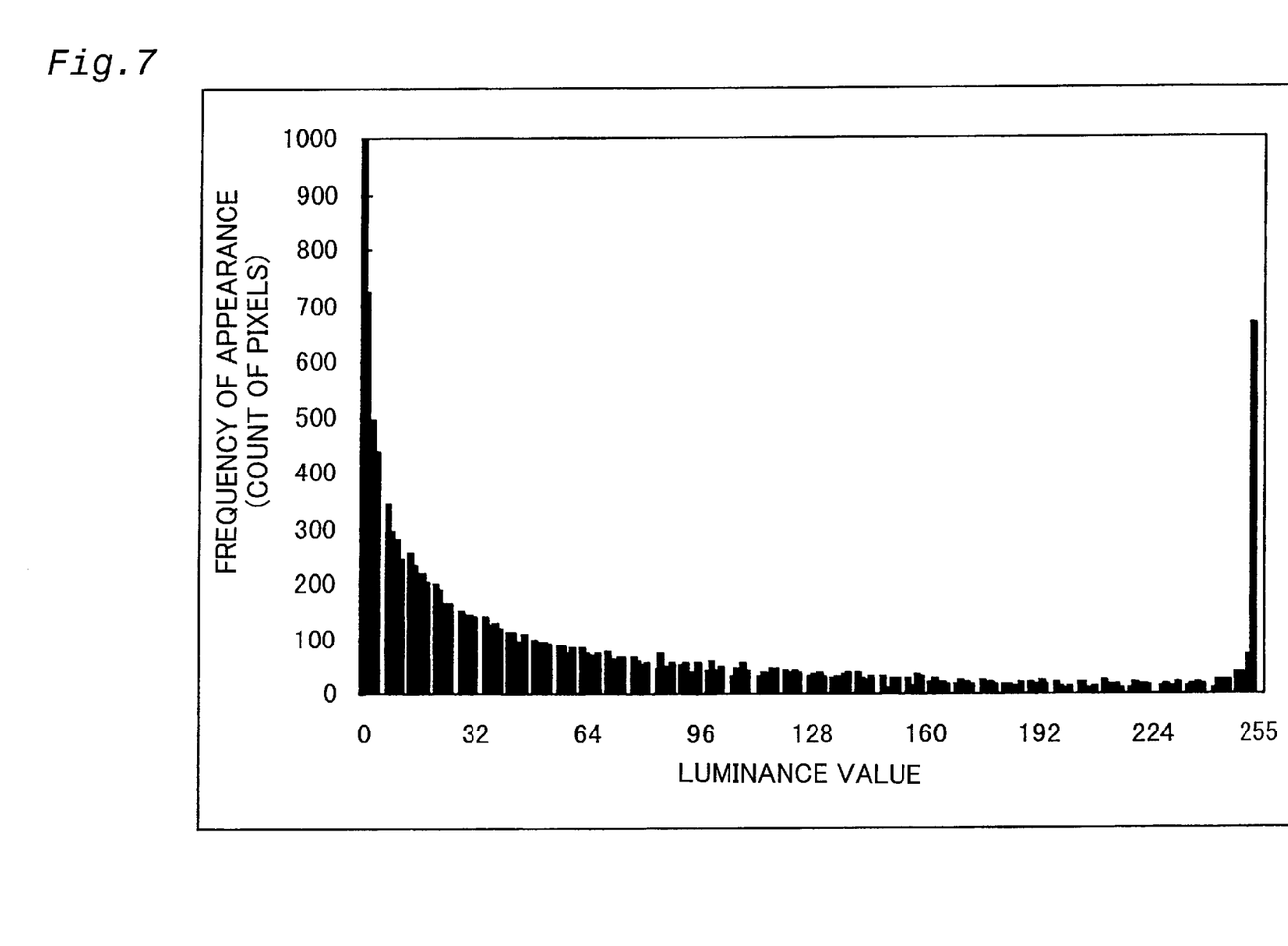
FIG. 7 is a histogram resulting from the photographic image of FIG. 6.

FIG. 7 is a histogram resulting from the photographic image of FIG. 6. In the procedures of this embodiment, the histogram is created with the luminance value as abscissa and the frequency of appearance (the count of pixels) of each luminance value as ordinate. The histogram of FIG. 7 shows that application of the infrared filter explicitly distinguishes the luminance values of the pixels constituting the area of the pointing image from the luminance values of the pixels constituting the residual background area. Although the procedures of the embodiment create the histogram, other graphs such as a line graph may be adopted instead.

At subsequent step S340 (FIG. 4), the threshold value determination section 252 in the position detection section 250 (FIG. 2) controls the image processing section 170 to create a cumulative area rate graph, which shows the cumulative area rate at each luminance value starting from 0, based on the histogram obtained at step S320. In this embodiment, the data of the cumulative area rate graph are stored in the image processing section 170. The data of the cumulative area rate graph may alternatively be stored in the main memory 200.

Figure 8:
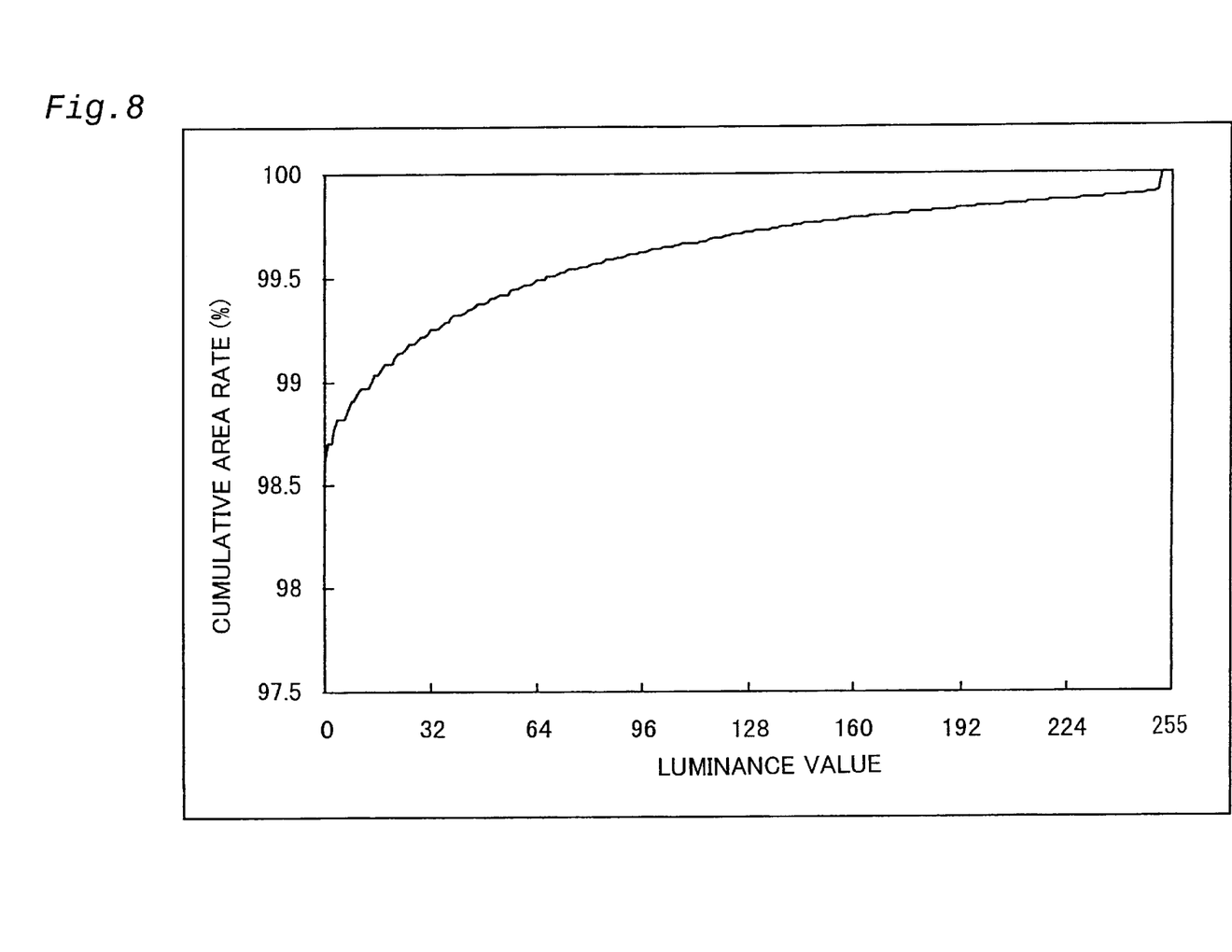
FIG. 8 is a cumulative area rate graph obtained from the histogram of FIG. 7.

FIG. 8 is a cumulative area rate graph obtained from the histogram of FIG. 7. In the cumulative area rate graph of FIG. 8, an abrupt increase of the cumulated area rate curve is observed at the luminance values of about 250. This is attributable to an increase in frequency of appearance (count of pixels) at the luminance values of about 250 in the histogram of FIG. 7. The cumulative area rate reaches 100% at the maximum luminance value 255.

The cumulative area rate graph of FIG. 8 is obtained by the following procedures. Based on the histogram of FIG. 7, the procedure first creates a cumulative distribution graph with the luminance value as abscissa and the cumulative count of pixels at each luminance value starting from 0 as ordinate. The procedure then creates a cumulative area rate graph with the luminance value as abscissa and the cumulative area rate at each luminance value starting from 0 as ordinate, based on this cumulative distribution graph. The cumulative area rate at each luminance value is calculated by dividing the cumulative count of pixels at each luminance value by the total number of pixels constituting the photographic image.

At step S360 (FIG. 4), the threshold value determination section 252 in the position detection section 250 (FIG. 2) controls the image processing section 170 to determine a threshold value, which is used to binarize the photographic image (FIG. 6), based on the cumulative area rate graph obtained at step S340.

In the procedures of this embodiment, a luminance value having a specific cumulative area rate (%) is determined as the threshold value for binarization. The threshold value determined by setting the value of the cumulative area rate may be varied in each photographic image obtained at step S300. The value according to the luminance property of the photographic image is thus set to the threshold value.

The value of the cumulative area rate used to determine the threshold value, that is, the threshold value determination condition, is set according to the desired pointing device PO selected at step S100 (FIG. 3). This ensures determination of the threshold value suitable for the selected pointing device and thus enables execution of the pointing position detection process adequate for the selected pointing device.

For example, in the case where the camera CM directly senses the infrared light that is emitted from the light emitter of the pointing device PO, the preferable setting specifies a luminance value having the cumulative area rate of 99.900% as the threshold value for binarization. In the case where the camera CM senses the infrared light that is emitted from the light emitter of the pointing device PO and then reflected from the screen SC, the preferable setting specifies a luminance value having the cumulative area rate of 99.995% as the threshold value for binarization. In the case where the camera CM senses the red light that is emitted from the light emitter of the laser pointer and then reflected from the screen SC, the preferable setting specifies a luminance value having the cumulative area rate of 99.990% as the threshold value for binarization.

The presenter's selection of the pointing device depends upon the environments for presentation, the taste of the presenter, and other factors. It is accordingly preferable that the threshold value determination condition (that is, the value of the cumulative area rate), which is set at step S100 and is used to determine the threshold value, is varied depending upon the selected pointing device, the shooting device, and the working environments like the environmental brightness.

At subsequent step S380 (FIG. 4), the binarization processing section 254 in the position detection section 250 (FIG. 2) controls the image processing section 170 to binarize the photographic image (FIG. 6) stored in the video memory 270 at step S300 using the threshold value obtained at step S360. The binarized photographic image (binary image) is stored in the video memory 270.

Figure 9:
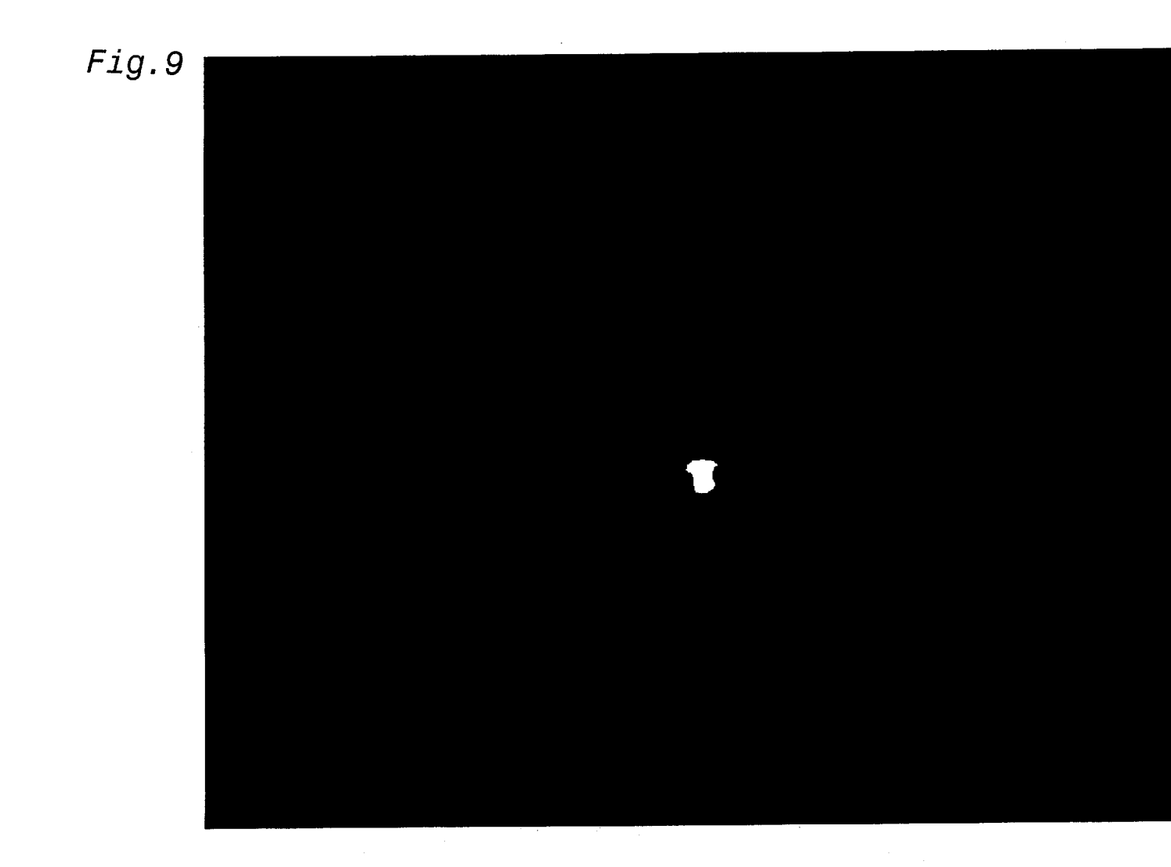
FIG. 9 illustrates a binary image obtained by binarizing the photographic image of FIG. 6 with an appropriate threshold value determined at step S360.

FIG. 9 illustrates a binary image obtained by binarizing the photographic image of FIG. 6 with an appropriate threshold value determined at step S360. In the example of FIG. 9, white represents a pixel area having higher luminance values not lower than the determined threshold value, whereas black represents a pixel area having lower luminance values than the determined threshold value. The process using the appropriate threshold value enables extraction of only a neighborhood area surrounding the pointing position. The neighborhood area surrounding the pointing position is smaller than the pointing image included in the photographic image shown in FIG. 6. The binarization process using the appropriate threshold value negates part of the peripheral region of the pointing image shown in FIG. 6, thereby ensuring the more accurate detection of the pointing position.

Figure 10:
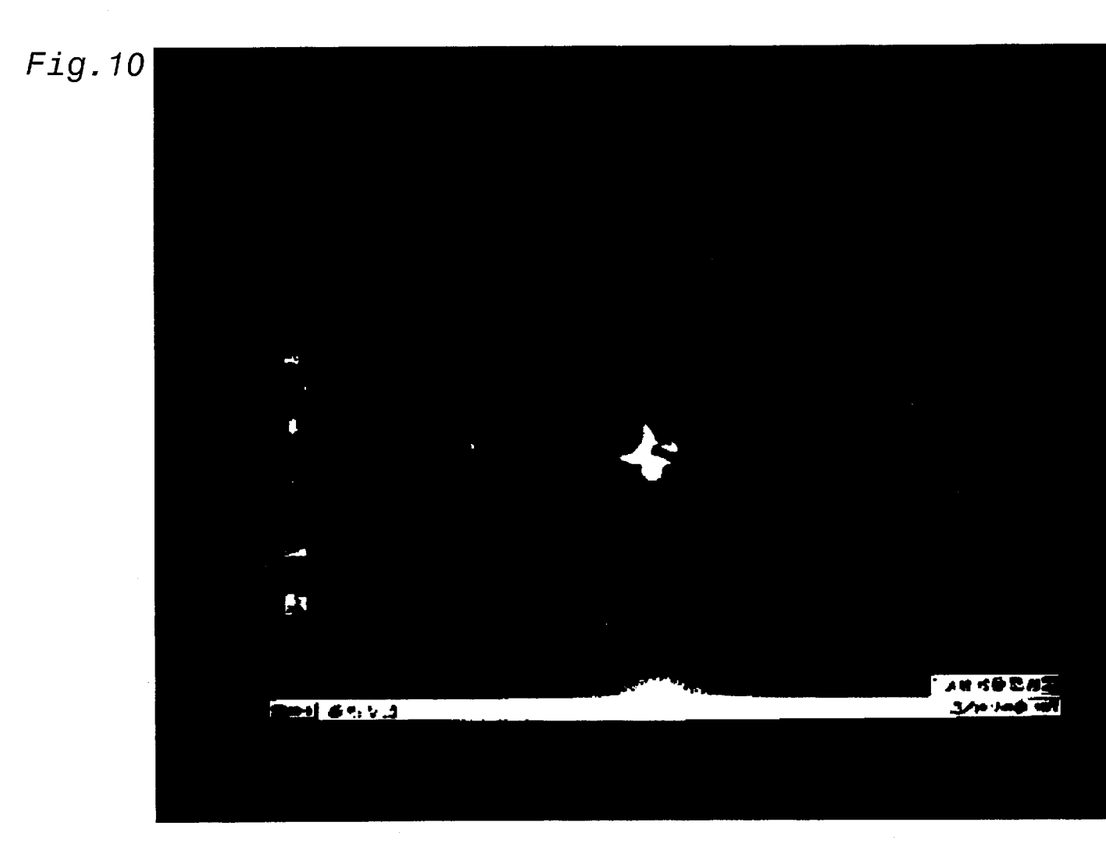
FIG. 10 shows a binary image obtained by binarizing the photographic image of FIG. 5 with the appropriate threshold value as a comparative example.

FIG. 10 shows a binary image obtained by binarizing the photographic image of FIG. 5 with the appropriate threshold value as a comparative example. Comparison between FIGS. 9 and 10 explicitly shows that binarization of the photographic image (FIG. 5) taken without attachment of the infrared filter extracts not only the neighborhood area surrounding the pointing position but other areas of relatively high luminances. When the white pixel areas are dispersed over a wide range as in the case of FIG. 10, it is extremely difficult to accurately detect the pointing position.

Figure 11:
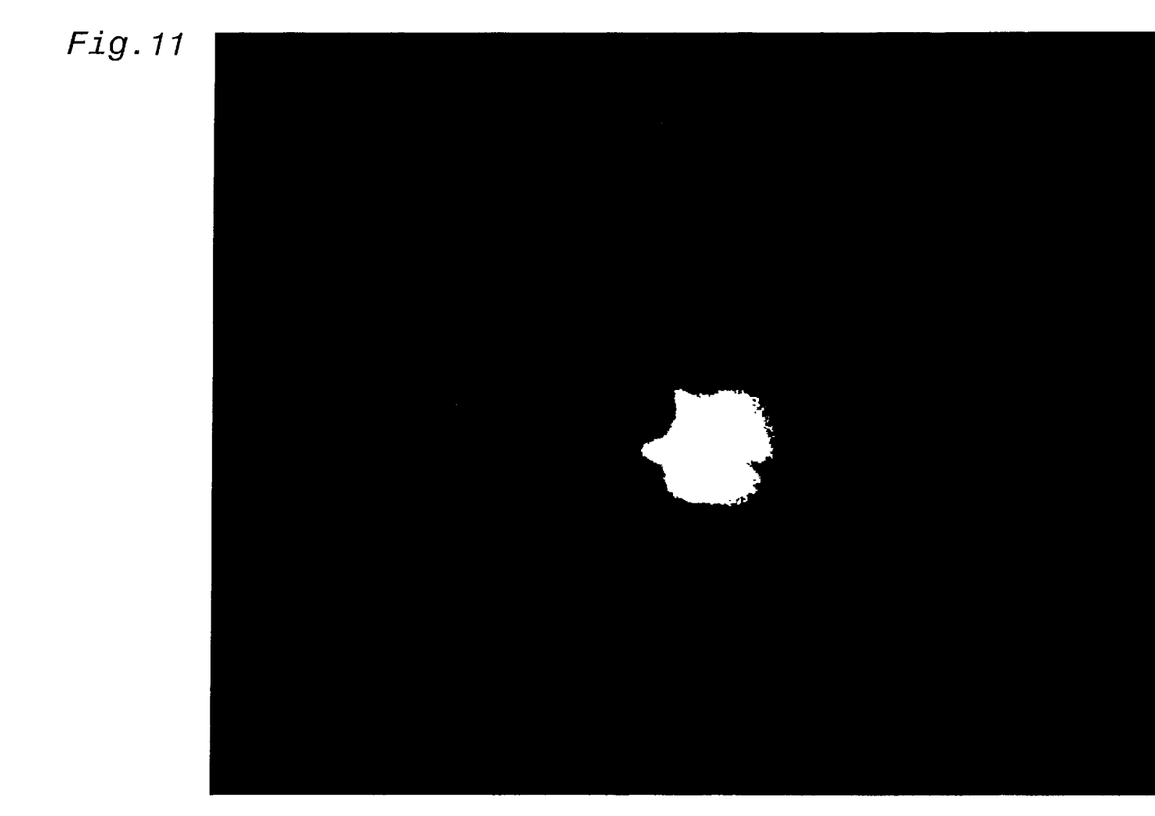
FIG. 11 shows a binary image obtained by binarizing the photographic image of FIG. 6 with a fixed threshold value as a comparative example.

FIG. 11 shows a binary image obtained by binarizing the photographic image of FIG. 6 with a fixed threshold value as a comparative example. Comparison between FIGS. 9 and 11 explicitly shows that fixing an inappropriate value to the threshold value results in extracting not only the neighborhood area surrounding the pointing position but an area far away from the pointing position. When the white pixel area is wider than the area of the pointing image shown in FIG. 6 as in the case of FIG. 11, it is extremely difficult to accurately detect the pointing position.

As discussed above with reference to FIGS. 9 through 11, the binarization of the photographic image (FIG. 6) taken with attachment of the infrared filter using the appropriate threshold value determined according to the luminance property of the photographic image ensures extraction of only the neighborhood area surrounding the pointing position in the binary image as shown in FIG. 9. In other words, the threshold value is determined to extract a pixel area in the binary image, which is smaller than the area of the pointing image in the photographic image. This arrangement gives extraction of only the neighborhood area surrounding the pointing position in the binary image, thus enabling the pointing position to be detected with a higher accuracy at step 400.

At subsequent step S400 (FIG. 4), the gravity center position computation section 256 in the position detection section 250 (FIG. 2) controls the image processing section 170 to detect the pointing position PP in the photographic image, based on the binary image obtained at step S380. The concrete procedure selects one pixel area having relatively high luminance values (that is, the white pixel area in FIG. 9) from two types of pixel areas included in binary image, regards the selected pixel area as an effective pixel area, and computes the coordinates of the center of gravity in the effective pixel area. The coordinates of the center of gravity in the effective pixel area, that is, coordinates (X, Y) of the pointing position in the photographic image, are calculated from the data on respective effective pixels constituting the effective pixel area according to the following equations. The coordinate data representing the pointing position in the photographic image are stored in the position detection section 250.

$$\text{X coordinate of pointing position} = \frac{\text{sum of X coordinates of respective effective pixels}}{\text{number of effective pixels}}$$

$$\text{Y coordinate of pointing position} = \frac{\text{sum of Y coordinates of respective effective pixels}}{\text{number of effective pixels}}$$

The gravity center position computation section converts the coordinate data in the photographic image into coordinate data in the display image DI, that is, coordinate data in the computer PC. The conversion of the coordinates is carried out, based on the positional relationship between the photographic image and the display image DI set at step S100 (FIG. 3).

At the last step S420 (FIG. 4), the position detection section 250 transmits the converted coordinate data to the mouse driver 240. This causes the converted coordinate data to be reflected on the operating system installed in the computer PC, as well as on the display driver 230 and the display adaptor 140. A mouse pointer is then shown at the pointing position PP in the display image on the display section 150 of the computer PC and the screen SC. Representation of the mouse pointer in the display image DI enables the presenter and any third person to readily identify the pointing position.

In the procedures of the embodiment, the processing of step S200 is carried out repeatedly as mentioned previously. This allows the pointing position in the display image to be detected continually. A variation in pointing position results in changing the display position of the mouse pointer.

In this embodiment, the pointing device PO has a button corresponding to a mouse button. A presenter's press of the button on the pointing device PO implements a click operation. A variety of processing can thus be carried out at the position defined by the mouse pointer in the display image (the computer image).

In this embodiment, the mouse pointer is shown at the pointing position PP in the display image DI. Representation of a cursor may replace the mouse pointer. One possible application draws such as a curve with a movement of the pointing position PP.

The procedures of the embodiment enable the detected pointing position to be reflected on a diversity of data processing.

As described above, the presentation system of this embodiment is provided with the detection processing section 250 and 170, which includes the threshold value determination section 252 that determines the threshold value used to binarize the photographic image according to the luminance property of the photographic image. Even when the angle between the normal direction of the screen SC and the pointing device increases and then the area irradiated with the light emitter is expanded, this arrangement enables the position pointed with the pointing device having the light emitter to be accurately detected in the display image.

The present invention is not restricted to the above embodiment or its modifications, but there may be many other modifications, changes, and alterations without departing from the scope or spirit of the main characteristics of the present invention. Some examples of possible modification are given below.

(1) In the procedures of the above embodiment, the threshold value determination section 252 obtains the cumulative area rate graph (step S340) from the cumulative distribution graph, which is based on the histogram. Another possible procedure may directly create the cumulative area rate graph from the photographic image.

In the above embodiment, the threshold value determination section 252 creates graphs such as the histogram, the cumulative distribution graph, and the cumulative area rate graph (steps S320 and S340). Another possible procedure may alternatively generate only data arrays (tables) that allow formation of the graphs.

In the above embodiment, the threshold value determination section 252 creates the histogram and the cumulative area rate graph with all the pixels included in the photographic image. The histogram and the cumulative area rate graph may alternatively be created with part of the pixels included in the photographic image. One applicable procedure skips part of the pixels included in the photographic image and creates the histogram and the cumulative area rate graph with a plurality of remaining pixels. This facilitates creation of the histogram and the cumulative area rate graph.

In general, the threshold value determination section creates a luminance value distribution, such as a histogram and a cumulative area rate graph, representing the count of pixels at each luminance value, based on the photographic image, and sets the threshold value equal to a luminance value determined by taking into account the luminance value distribution and a preset threshold value determination condition. This procedure facilitates determination of the threshold value.

(2) In the procedures of the above embodiment, the value of the cumulative area rate (the threshold value determination condition) set at step S100 is kept constant in the course of repeat of the processing of step S200. The number of pixels constituting the effective pixel area (the white pixel area) in the binary image obtained at step S380 is thus substantially fixed to a same value. Namely the threshold value determination section 252 of the above embodiment determines the threshold value to make a substantially fixed number of effective pixels included in the binary image. The threshold value determination section 252 may thus select a fixed number of pixels in the descending order of the luminance among the pixels included in the photographic image and determine the luminance value of the last selected pixel as the threshold value.

In general, the threshold value determination section determines the threshold value, which is used to binarize the photographic image, according to the luminance property of the photographic image.

(3) The above embodiment uses the front-type projector PJ. The front-type projector PJ may be replaced with a rear-type projector that projects images from the rear side of the screen SC or the rear side of the observation face towards the display area of the screen SC.

(4) The above embodiment uses the liquid crystal projector PJ. The liquid crystal projector PJ may be replaced with another projector that adopts a high intensity CRT or a DMD (digital micromirror device: trade mark by TI Inc.).

(5) In the embodiment discussed above, the presenter 10 points at an arbitrary position in the display image DI, which is projected in the display area on the screen SC by the projector PJ. The presenter may also point at an arbitrary position in the display image in a display area of another image display apparatus. Another image display apparatus may be a CRT or a PDP (plasma display panel).

What is claimed is:

1. A pointing position detection apparatus that detects a pointing position, which is pointed with a pointing device having a light emitter, in a display image, the pointing position detection apparatus comprising:
   a photographic image capture section that captures a photographic image by shooting the display image including a pointing image generated by light emitted from the light emitter of the pointing device; and
   a detection processing section that detects the pointing position in the display image according to a luminance property of the captured photographic image,
   the detection processing section comprising:
   a threshold value determination section that determines a threshold value, which is used to binarize the photographic image, according to the luminance property of the photographic image;
   a binarization processing section that binarizes the photographic image using the determined threshold value, so as to generate a binary image; and
   a gravity center position computation section that computes a position of a center of gravity in one pixel area having relatively high luminance values, out of two types of pixel areas constituting the binary image, so as to detect the pointing position.

2. A pointing position detection apparatus in accordance with claim 1, wherein the threshold value determination section creates a luminance value distribution, which represents a count of pixels at each luminance value, based on the photographic image, and sets the threshold value equal to a luminance value determined by taking into account the luminance value distribution and a preset threshold value determination condition.

3. A pointing position detection apparatus in accordance with claim 2, wherein the threshold value allows extraction of a pixel area in the binary image which is smaller than an area of the pointing image in the photographic image.

4. A pointing position detection apparatus in accordance with claim 2, wherein the detection processing section further comprises:
   a table that stores a plurality of threshold value determination conditions, which are provided respectively for a plurality of available pointing devices, and
   the threshold value determination section determines the threshold value using a threshold value determination condition selected among the plurality of threshold value determination conditions.

5. A pointing position detection apparatus in accordance with claim 1, wherein the detection processing section repeatedly carries out detection of the pointing position.

6. A pointing position detection apparatus in accordance with claim 1, wherein the photographic image capture section has a shooting device that takes the photographic image.

7. A pointing position detection apparatus in accordance with claim 6, wherein the pointing device has the light emitter that emits either one of a visible light and an invisible light, and
   the shooting device senses a light component emitted from the light emitter.

8. A pointing position detection apparatus in accordance with claim 7, wherein the shooting device has a filter that allows transmission of the light component emitted from the light emitter of the pointing device, while cutting off other light components.

9. A pointing position detection apparatus in accordance with claim 8, wherein the shooting device has an aperture to adjust brightness of the photographic image.

10. A pointing position detection apparatus in accordance with claim 9, wherein the detection processing section further comprises:

a table that stores a plurality of shooting conditions, which are respectively provided for a plurality of available pointing devices, and the position detection section controls the shooting device to adjust the aperture, based on a shooting condition selected among the plurality of shooting conditions.

11. A presentation system, comprising:

a pointing position detection apparatus in accordance with claim 1; and an image display apparatus that causes the display image to be displayed in a display area.

12. A presentation system in accordance with claim 11, wherein the pointing position detection apparatus causes the detected pointing position to be reflected on predetermined data processing.

13. A presentation system in accordance with claim 11, wherein the image display apparatus is a projector that projects the display image from either one of a front side and a rear side of a screen including the display area.

14. A method of detecting a pointing position, which is pointed with a pointing device having a light emitter, in a display image, the method comprising the steps of:

(a) capturing a photographic image by shooting the display image including a pointing image generated by light emitted from the light emitter of the pointing device; and (b) detecting the pointing position in the display image according to a luminance property of the captured photographic image, the step (b) comprising the steps of:

(b1) determining a threshold value, which is used to binarize the photographic image, according to the luminance property of the photographic image;

(b2) binarizing the photographic image using the determined threshold value, so as to generate a binary image; and (b3) computing a position of a center of gravity in one pixel area having relatively high luminance values, out of two types of pixel areas constituting the binary image, so as to detect the pointing position.

15. A method in accordance with claim 14, wherein the step (b1) comprises the step of:

creating a luminance value distribution, which represents a count of pixels at each luminance value, based on the photographic image, and setting the threshold value equal to a luminance value determined by taking into account the luminance value distribution and a preset threshold value determination condition.

16. A method in accordance with claim 15, wherein the threshold value allows extraction of a pixel area in the binary image which is smaller than an area of the pointing image in the photographic image.

17. A method in accordance with claim 15, wherein the step (b1) comprises the step of:

determining the threshold value based on a threshold value determination condition, which is selected among a plurality of threshold value determination conditions provided respectively for a plurality of available pointing devices.

18. A method in accordance with claim 14, wherein the step (b) is carried out repeatedly.

19. A computer program product that causes a computer to detect a pointing position, which is pointed with a pointing device having a light emitter, in a display image, the computer program product comprising:

a computer readable recording medium; and a computer program recorded in the recording medium, the computer program causing the computer to attain the functions of:

capturing a photographic image by shooting the display image including a pointing image generated by light emitted from the light emitter of the pointing device; and detecting the pointing position in the display image according to a luminance property of the captured photographic image, the detection function comprising the functions of:

determining a threshold value, which is used to binarize the photographic image, according to the luminance property of the photographic image;

binarizing the photographic image using the determined threshold value, so as to generate a binary image; and computing a position of a center of gravity in one pixel area having relatively high luminance values, out of two types of pixel areas constituting the binary image, so as to detect the pointing position.

20. A computer program product in accordance with claim 19, wherein the threshold value determination function comprises the function of:

creating a luminance value distribution, which represents a count of pixels at each luminance value, based on the photographic image, and setting the threshold value equal to a luminance value determined by taking into account the luminance value distribution and a preset threshold value determination condition.

21. A computer program product in accordance with claim 20, wherein the threshold value allows extraction of a pixel area in the binary image which is smaller than an area of the pointing image in the photographic image.

22. A computer program product in accordance with claim 20, wherein the threshold value determination function comprises the function of:

determining the threshold value based on a threshold value determination condition, which is selected among a plurality of threshold value determination conditions provided respectively for a plurality of available pointing devices.

23. A computer program product in accordance with claim 19, wherein the detection function comprises the function of carrying out the detection of the pointing position repeatedly.

* * * * *